United States Patent [19]
Grandfield et al.

[11] Patent Number: 5,802,452
[45] Date of Patent: Sep. 1, 1998

[54] MULTIPLE CHANNEL RADIO FREQUENCY REPEATER

[75] Inventors: John E. Grandfield, W. Yarmouth; John M. Collins, Hingham; William H. Hewett, Lakeville, all of Mass.

[73] Assignee: GTE Government Systems Corporation, Needham, Mass.

[21] Appl. No.: 587,411

[22] Filed: Jan. 17, 1996

[51] Int. Cl.$^6$ .................................................. H04B 7/14
[52] U.S. Cl. ........................ 455/20; 455/10; 455/17; 370/315
[58] Field of Search ......................... 455/7, 9, 10, 11.1, 455/16, 17, 15, 20, 22, 13.4, 13.3, 560, 561, 87, 116, 115, 226.1, 226.2, 234.1; 370/274, 276, 279, 293, 315

[56] References Cited

U.S. PATENT DOCUMENTS

| | | | |
|---|---|---|---|
| 3,886,452 | 5/1975 | Seidel | 455/22 |
| 4,002,980 | 1/1977 | Herz | 455/17 |
| 4,764,979 | 8/1988 | Noguchi et al. | 455/22 |
| 5,023,930 | 6/1991 | Leslie | 455/9 |
| 5,230,098 | 7/1993 | Seki | 455/234.1 |
| 5,287,543 | 2/1994 | Wolkstein | 455/13.3 |

*Primary Examiner*—Reinhard J. Eisenzopf
*Assistant Examiner*—Lee Nguyen
*Attorney, Agent, or Firm*—Leonard C. Suchyta; Floyd E. Anderson

[57] ABSTRACT

A multiple channel radio frequency repeater has a receive port for receiving an input signal from a first antenna and a transmit port for transmitting a frequency shifted output signal to a second antenna. An input bandpass filter is located at the input port. A low noise amplifier follows the input bandpass filter for amplifying all signals within the input bandwidth. A plurality of channel filters divide the input signal into a plurality of channel signals. A local oscillator generates a local oscillator (LO) signal. There is a mixer corresponding to each channel, each mixer has an input port, an output put port and an LO port. The LO port is coupled to the local oscillator. An Automatic Gain Control (AGC) amplifier is between each channel filter and each mixer for adjusting the channel signal level to the mixer input port to assure that each mixer has the same level amplified channel signal. The LO signal is mixed with the amplified channel signal at the mixer input port to shift the frequency of the amplified channel signal at the mixer input port to an output frequency at the mixer output port. An output bandpass filter between the output ports of the mixers and the repeater output port for combines and couples the plurality of frequency shifted channel signals to the repeater output port.

4 Claims, 2 Drawing Sheets

MULTIPLE CHANNEL RADIO FREQUENCY REPEATER

BACKGROUND

This invention pertains to radio frequency (RF) repeaters, and more particularly is concerned with repeaters having multiple channels.

The need arises in many RF data links where line of sight configuration cannot meet the range requirements necessary for reliable communications. The range of current communications systems can be extended using repeaters.

Two types of repeater are well known in the prior art. The first type is a repeater that converts a single input RF signal to a different frequency then transmits this signal. This type of repeater lends itself to a single channel. Intermodulation distortion can be generated if multiple input signals are presented to this type of repeater. The intermodulation is generated by nonlinearity in the mixing and amplification's states of the repeater. The intermodulation can distort the quality of adjacent channels and decrease the acceptable range of the repeater. If one of the input signals is greater in amplitude than the other, the intermodulation can overwhelm the lower level signal and degrade its performance.

The second type is a repeater that processes the input signals and converts the received signal to a base band level before retransmitting. This type of repeater lends itself to an extremely complex configuration if multiple inputs are desired with high data rates. Intermodulation is also a problem with this type of repeater if multiple signals are required for translation. Another problem that can occur with the processing type repeater is the complexity of handling encryption. De-encrypting the incoming signal and then encrypting multiple signals would need multiple encryption keys in an environment that can be non-secure. The de-encryption and re-encryption would also generate delays and timing problems.

Both types of repeaters lack the capability to retransmit and control multiple high data rate signals. To translate multiple signals, multiple repeaters have to be used.

An object of the invention is to provide multiple high data rate channels that can be controlled without generating interference between each channel, while also optimizing the RF output power.

SUMMARY OF THE INVENTION

Briefly, according one aspect of the invention, there is provided a multiple channel radio frequency repeater which has a receive port for receiving an input signal from a first antenna and a transmit port for transmitting a frequency shifted output signal to a second antenna. An input bandpass filter is located at the input port. A low noise amplifier follows the input bandpass filter for amplifying all signals within the input bandwidth. A plurality of channel filters divide the input signal into a plurality of channel signals. A local oscillator generates a local oscillator (LO) signal. There is a mixer corresponding to each channel, each mixer has an input port, an output port and an LO port. The LO port is coupled to the local oscillator. An Automatic Gain Control (AGC) amplifier is between each channel filter and each mixer for adjusting the channel signal level to the mixer input port to assure that each mixer has the same level amplified channel signal. The LO signal is mixed with the amplified channel signal at the mixer input port to shift the frequency of the amplified channel signal at the mixer input port to an output frequency at the mixer output port. An output bandpass filter is located between the output port of each mixer and the repeater output port for combining and coupling the plurality of frequency shifted channel signals to the repeater output port.

DETAILED DESCRIPTION OF THE INVENTION

Figure 1:
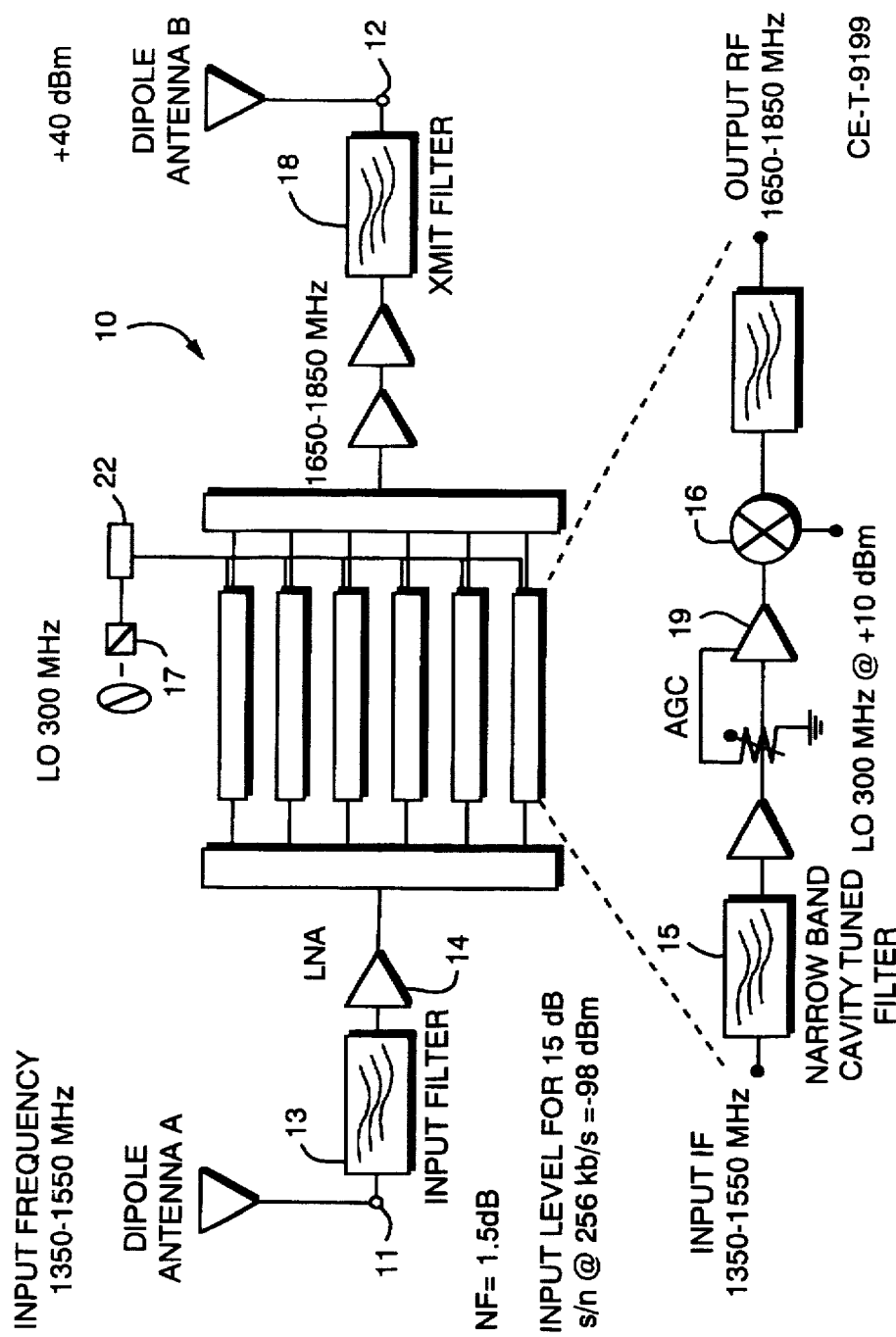
FIG. 1 is the block diagram of a multiple channel, broadband, high data rate radio frequency repeater embodying the invention.

Referring first to FIG. 1, there is seen a multiple channel, broadband, high data rate radio frequency repeater embodying the invention. As is well known, the receiver to transmitter isolation in a repeater design is extremely critical. Insufficient isolation between the transmitter and the receiver can cause RF leakage into the receiver from the transmitter and severely degrade the performance of the repeater. To provide isolation between the transmitter and the receiver, right-hand and left-hand circular polarized antennas A,B may be used at the receive port 11 and transmit port 12 of the repeater. The circular polarized antennas also help mitigate against multipath effects.

Input signals are in frequency channels in the band of 1350–1550 MHz. Input bandpass filter 13 having this bandwidth is provided at the input 11 of the repeater. The input filter is followed by low noise amplifier 14 which amplifies all signals within the input bandwidth.

After low noise amplifier, the input signal is channeled into, for example, six channels using cavity tuned channel filters 15. Each channel includes a corresponding mixer 16. The channel filters 15 give greater than 40 dB of isolation between each of the channels. This amount of isolation between channels is critical if intermodulation distortion is to be kept at a minimum. Each mixer 16 is driven by a local oscillator signal of 300 MHz from local oscillator 17. The local oscillator signal is mixed with the input signal to shift the frequency to the output band of 1650–1850 MHz. Output bandpass filter 18 having this bandwidth is provided at the output 12 of the repeater. The bandpass filters in combination with the circularity polarized antennas give over 120 db isolation between input and output of the repeater. The above frequencies are for example only.

An important feature of the invention is after each channel filter 15, there is provided an Automatic Gain Control (AGC) amplifier 19. The AGC amplifier adjusts the input level to the mixer 16 to assure that the mixer is not driven into compression, thus avoiding unwanted intermodulation products. The AGC amplifier also compensates for variations in input levels between channels such as due to differences in the terrain distance of in the input signals. The AGC amplifiers bring all signals in the channels to the same level so that the intermodulation effects of a stronger signal do not overwhelm a weaker signal.

The AGC amplifier's output voltage may be used to monitor the quality of the received input signal. Each channel's AGC voltage is compared to a predetermined reference voltage which corresponds to a useful S/N ratio.

Figure 2:
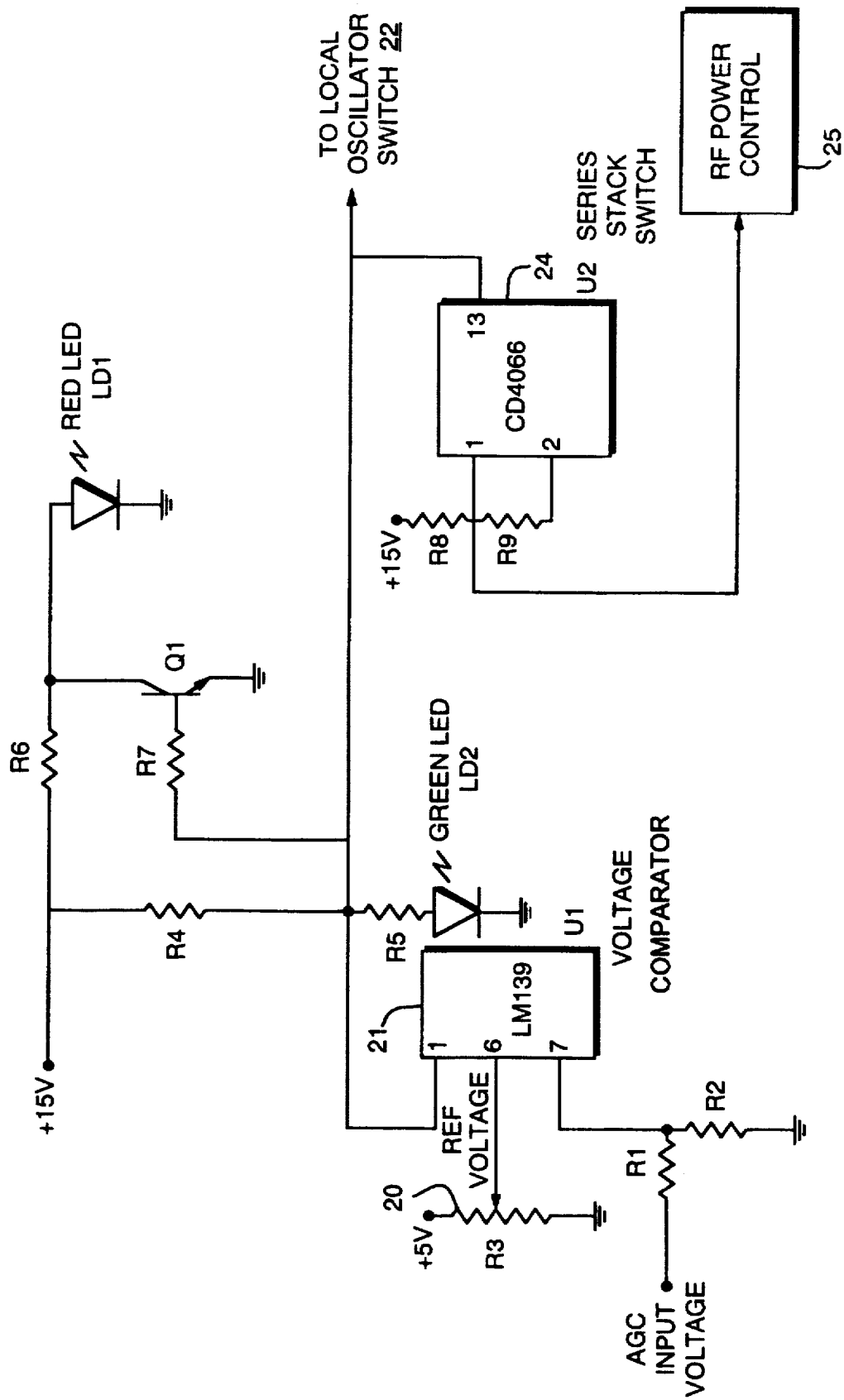
FIG. 2 is a schematic drawing a control circuit used on each channel of the repeater of FIG. 1.

FIG. 2 is a schematic drawing of a control circuit used on each channel of the repeater of FIG. 1. The reference voltage is achieved by adjusting variable resistor 20, at the input to voltage comparator 21. When the received signal is above the adjusted s/n level, the voltage comparator sends a 5 volt level to a Local Oscillator (LO) channel switch 22 and turns the LO drive on for that channel. When the signal level falls below the desired S/N ratio, the comparator sends a 0 volt level to the LO switch thereby shutting down that channel's Local Oscillator drive to it's mixer, which then drops that channel's output level by 40 dB to the final amplifier. Even when the LO drive is turned off, the AGC voltage will still track the input S/N ratio and will turn the channel back on when the S/N returns to a useful level. The output voltage from the voltage comparator also turns on or off a series stack switch 24 that controls the input voltage to a voltage controlled attenuator 25 that adjusts the RF output power upward or downward depending on the number of channels being used. Without the adaptive adjustment, an unusable signal would still be repeated and the RF energy would be wasted.

The adaptive channel and power control monitors each of the input signals quality. The quality of the signal is determined by comparing the AGC voltage on a channel by channel basis to a predetermined reference voltage. Each channel is monitored to a desired signal to noise ratio and on this decision of the comparator that channel is either turned on or off. If the channel is turned off, the RF power that was allocated for that channel is then routed to the other channels that are being used. By constantly monitoring the Automatic Gain control (AGC) voltage on each channel, a determination of the quality of the input signal to noise level (S/N) on a channel by channel basis is made. From the decision made from the S/N level adjustment and control of the composite output level of the repeater optimum operation is obtained. Noisy unusable channels can be shut off and the power that was used for them can be distributed to the remaining channels with an acceptable input signal level.

The multiple-channel power adaptive repeater of the invention has the capability to re-transmit and control multiple high data rate signals. It also minimizes intermodulation distortion by maintaining linear operation through out all amplifier stages. Narrow band channels are used so only two tone intermodulation products can occur through the mixing stage. Automatic gain control equalizes the output signal levels between each input signal.

The multiple-channel power adaptive repeater is capable of repeating up to six channels simultaneously and can adaptively control the output power level and number of channels that are transmitted depending on the quality of the received signals. Prior art repeater technology was used for a single low data rate channel with no adaptive control of the incoming signals.

What is claimed is:

1. A multiple channel radio frequency repeater, having a plurality of channels, comprising:
   a receive port or an input port for receiving an input signal from a first antenna
   a transmit port or an output port for transmitting a frequency shifted output signal to a second antenna;
   an input bandpass filter at the input port;
   a low noise amplifier following said input bandpass filter for amplifying all signals within an input bandwidth;
   a plurality of channel filters for dividing the input signal into a plurality of channel signals;
   a local oscillator for providing a local oscillator (LO) signal;
   a mixer corresponding to each channel, each mixer having an input port, an output port and an LO port, said LO port coupled to said local oscillator;
   an Automatic Gain Control (AGC) amplifier between each channel filter and each mixer for adjusting a channel signal level to the mixer input port to assure that each mixer has substantially equal level amplified channel signal, whereby the LO signal is mixed with the amplified channel signal at the mixer input port to shift a frequency of the amplified channel signal at the mixer input port to an output frequency at the mixer output port;
   an output bandpass filter interposed between the output ports of said mixers and said repeater output port for combining and coupling the plurality of frequency shifted channel signals to said repeater output port;
   a LO channel switch interposed between each mixer LO port and said local oscillator;
   each AGC amplifier having an output voltage corresponding to the level of the unamplified channel signal; and
   a voltage comparator corresponding to each channel for comparing each AGC amplifier's output voltage to a reference voltage, and for providing a switching signal to the corresponding LO channel switch for turning the LO signal off for that channel when the unamplified channel signal level falls below a preset value, and for turning the LO signal on when the unamplified channel signal level meets or exceeds a preset value.

2. The multiple channel radio frequency repeater of claim 1 further comprising:
   each AGC amplifier having an output voltage corresponding to the level of the unamplified channel signal;
   a series stack switch corresponding to each channel for controlling a voltage controlled attenuator for adjusting the RF output power upward or downward; and
   a voltage comparator corresponding to each channel for comparing each AGC amplifier's output voltage to a reference voltage, and for providing a switching signal to the corresponding series stack switch for turning the RF output power for that channel off when the unamplified channel signal level falls below a preset value, and for turning the RF output power for that channel on when the unamplified channel signal level rises to a preset value.

3. In a multiple channel radio frequency repeater, a method of providing multiple channels therethrough, said method comprising steps of:
   receiving an input signal at a first antenna;
   bandpass filtering each input signal;
   amplifying each input signal within an input bandwidth as limited by the bandpass filtering step;
   dividing the input signal into a plurality of channel signals;
   providing a local oscillator (LO) signal;
   mixing each channel signal with said LO signal;
   transmitting a frequency shifted output signal to a second antenna;
   adjusting a level of each channel signal to a predetermined level to assure that amplified channel signal has a like level, whereby the LO signal is mixed with the amplified channel signal to shift the frequency of the amplified channel signal;
   combining and coupling the plurality of frequency shifted channel signals to be provided at an output port;
   providing an output voltage corresponding to the level of an unamplified channel signal; and
   comparing each amplified channel signal voltage to a reference voltage for providing a switching signal to a corresponding LO channel switch for turning the LO signal off for that channel when the unamplified channel signal level falls below a preset value, and for turning the LO signal on when the unamplified channel signal level meets or exceeds a preset value.

4. The method according to claim 3 further comprising steps of:

controlling a voltage controlled attenuator for adjusting an RF output power upward or downward; and comparing each amplified channel signal voltage to a reference voltage for providing a switching signal to a corresponding series stack switch for turning a corresponding RF output power for that channel off when the unamplified channel signal level falls below a preset value, and for turning the RF output power for that channel on when the unamplified channel signal level rises to a preset value.

* * * * *